United States Patent
Leukkunen et al.

(10) Patent No.: US 7,957,700 B2
(45) Date of Patent: Jun. 7, 2011

(54) TRANSMITTER DELAY AND PHASE ADJUSTMENT

(75) Inventors: Marko Leukkunen, Oulu (FI); Kauko Heinikoski, Oulu (FI)

(73) Assignee: Nokia Corporation, Espoo (FI)

( * ) Notice: Subject to any disclaimer, the term of this patent is extended or adjusted under 35 U.S.C. 154(b) by 1386 days.

(21) Appl. No.: 11/471,606

(22) Filed: Jun. 21, 2006

(65) Prior Publication Data

US 2007/0072559 A1 Mar. 29, 2007

(30) Foreign Application Priority Data

Jun. 30, 2005 (FI) .................................. 20055367

(51) Int. Cl.
*H04B 17/00* (2006.01)
(52) U.S. Cl. ............... 455/67.16; 455/115.1; 455/114.2; 455/115.2; 455/115.3; 455/126; 455/553.1; 455/59; 455/61; 455/67.11; 455/67.13; 455/67.14
(58) Field of Classification Search ............... 455/114.3, 455/114.2, 115.1–115.4, 126, 127.1, 127.2, 455/522, 59, 61, 67.11–67.16, 67.7, 69, 70
See application file for complete search history.

(56) References Cited

U.S. PATENT DOCUMENTS

| | | | | |
|---|---|---|---|---|
| 5,014,344 A | * | 5/1991 | Goldberg | 455/503 |
| 5,901,345 A | * | 5/1999 | Ikeda et al. | 455/114.3 |
| 6,516,183 B1 | | 2/2003 | Hellmark | |
| 7,139,539 B2 | * | 11/2006 | Chun | 455/127.1 |
| 7,236,750 B2 | * | 6/2007 | Vaidyanathan et al. | 455/84 |
| 2004/0204100 A1 | * | 10/2004 | Braithwaite | 455/561 |
| 2004/0219892 A1 | * | 11/2004 | Vaidyanathan et al. | 455/103 |
| 2005/0239419 A1 | * | 10/2005 | Fudaba et al. | 455/101 |

FOREIGN PATENT DOCUMENTS

| | | |
|---|---|---|
| EP | 0 762 632 A1 | 3/1997 |
| JP | 60136426 | 7/1985 |
| WO | WO 2004/077662 A1 | 9/2004 |

* cited by examiner

*Primary Examiner* — Edward Urban
*Assistant Examiner* — Junpeng Chen
(74) *Attorney, Agent, or Firm* — Squire, Sanders & Dempsey (US) LLP

(57) ABSTRACT

A transmitter, including at least two transmitter units, each transmitter unit being configured to input an instance of a digital transmit signal, to convert the digital transmit signal to an analog radio signal, and to amplify the analog radio signal. The transmitter is configured to determine a timing difference between the amplified signals, and to adjust timing of at least one of the input signals, so that a predetermined criterion is fulfilled.

22 Claims, 7 Drawing Sheets

TRANSMITTER DELAY AND PHASE ADJUSTMENT

FIELD

The invention relates to transmitter technology. Especially, the invention relates to improving delay and phase adjustment of a radio signal in a transmitter.

BACKGROUND

A transmitter's, such as a base station's, output power can basically be increased in two alternative ways; either by introducing components that are capable of providing the desired output signal or by using low-power components that process the same signal and whose outputs are adjusted to the same level and combined with an output signal of the transmitter. The latter is often a more advantageous way due to potential savings in view of costs of the transmitter.

When summing two same transmit signals to increase output power, the delays and the phases of the transmitters have strict requirements. Without accurate delay and phase control, it is impossible to sum outputs of several transmitters efficiently. In prior art, separate transmitters whose signals are combined are calibrated either to a nominal delay or with regard to each other. Calibration, however, requires additional measurement equipment and is very difficult and time consuming. Furthermore, calibration performed at a certain moment cannot take into account the delay drifting of the transmitter, which is due to aging, for instance.

In a feed-forward transmitter, summation of signals is done before power amplifiers on small signal level. The summed signal is then divided between two power amplifiers and combined again after the power amplifiers. Because of differences in delay and the phase of the power amplifiers, delays of the power amplifiers must be controlled accurately to achieve successful power combining.

A digital predistortion transmitter is a transmitter where the distortion caused by a power amplifying step of a transmitter unit is feedback to digital form and compensated digitally by summing a digital opposite distortion element to the signal.

When aiming to increase of transmit power in a predistortion transmitter by combining, the logic known from a feed-forward transmitter is not applicable. That is, small signal summing and division of the sum signal to separate power amplifiers would make it impossible to determine the correction distortions needed for individual transmitter units.

SUMMARY

It is thus an object of the present invention to provide improved delay and phase control for a transmitter.

In one aspect of the invention, there is provided a transmitter, including at least two transmitter units, each transmitter unit being configured to input an instance of a digital transmit signal, convert the digital transmit signal to an analog radio signal, amplify the analog radio signal, output the amplified radio signal, wherein the transmitter is configured to determine a timing difference between the output signals of the transmitter units, and adjust timing of at least one of the input signals, so that a predetermined criterion is fulfilled.

In another aspect of the invention, there is provided a base station, including at least two transmitter units, each transmitter unit including means for inputting an instance of a digital transmit signal, means for converting the digital transmit signal to an analog radio signal, means for amplifying the analog radio signal. The base station further includes means for determining a timing difference between the amplified signals, and means for adjusting timing of at least one of the input signals, so that a predetermined criterion is fulfilled.

In another aspect of the invention, there is provided a mobile station, including at least two transmitter units, each transmitter unit including means for inputting an instance of a digital transmit signal, means for converting the digital transmit signal to an analog radio signal, means for amplifying the analog radio signal. The mobile station further includes means for determining a timing difference between the amplified signals, and means for adjusting timing of at least one of the input signals, so that a predetermined criterion is fulfilled.

In another aspect of the invention, there is provided a method for processing a signal in a transmitter, including steps of: inputting an instance of the same digital input signal into at least two transmitter units, converting, in each transmitter unit, the digital transmit signal to an analog radio signal and amplifying the analog radio signals, determining a timing difference between the amplified signals, and adjusting timing of at least one of the input signals, so that a predetermined quality criterion is fulfilled.

In still another aspect of the invention, there is provided a software product, including software code portions for implementing steps of: inputting an instance of the same digital input signal into at least two transmitter units, converting, in each transmitter unit, the digital transmit signal to an analog radio signal and amplifying the analog radio signals, determining a timing difference between the amplified signals, adjusting timing of at least one of the input signals so that a predetermined quality criterion is fulfilled.

The invention relates to a delay and phase power control mechanism for a network element in a mobile network. The mobile network according to the invention can be Universal Mobile Telephony System (UMTS) employing Wideband Code Division Multiple Access (WCDMA) radio technology, for instance, without restricting the invention to such a network. The network element according to the invention can be a base station/Node B or a mobile terminal.

In the invention, there are two or more transmitter units in a transmitter. Each transmitter unit provides an analog amplified signal. The timing differences, that is delay and phase differences, of the amplified signals are determined and corrected if needed so that a predetermined quality criterion is fulfilled. In one embodiment, the inventive idea is used to increase output power from the transmitter by combining outputs of the transmitter units. In another embodiment, the inventive concept may be used in a smart antenna system to calibrate accurate phase and delay for different antenna elements.

In one embodiment, the outputs of the transmitter units are directly compared. In another embodiment, the outputs of the transmitter units are summed to a sum signal and the respective delays of the signals are determined from the sum signal. The signal of which the delays and phases of the separate signals are determined can also be a filtered sum signal, for instance.

The invention provides several advantages. First, there is no need to calibrate the transmitter delay and phase during the manufacture of the transmitter. Furthermore, the timing (delay and phase) adjustment is adaptive and therefore the transmitter tolerates well negative effects of aging and temperature, for instance. In the transmitter according to the invention, the combined power is easy to keep on the optimum level.

DRAWINGS

In the following the invention will be described in greater detail by means of preferred embodiments with reference to the attached drawings, in which FIG. 1 is one embodiment of a network according to the invention;

Figure 9:
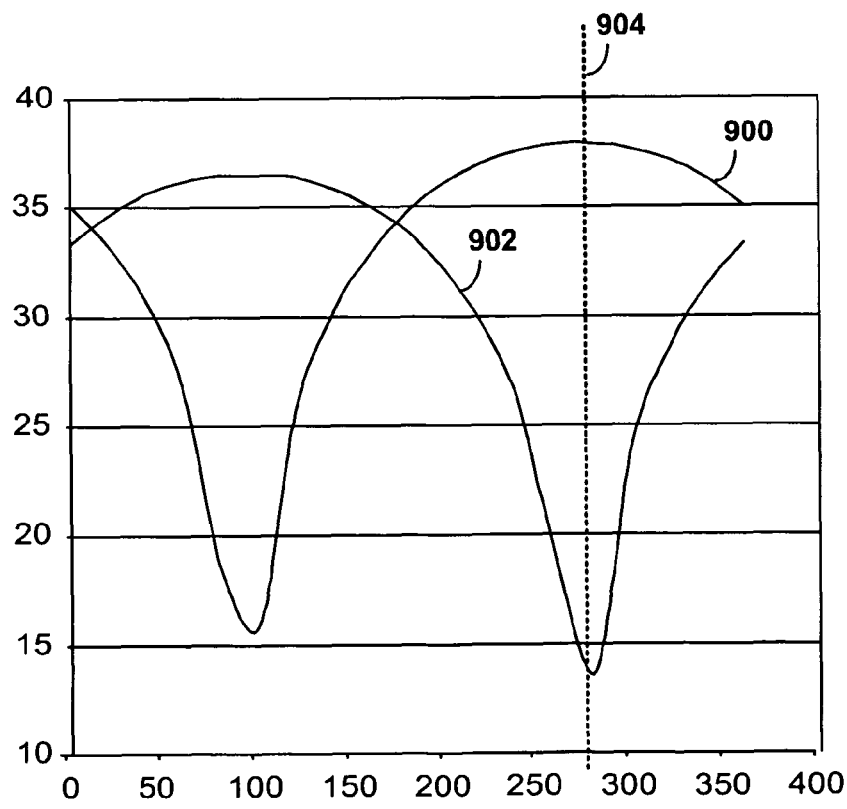

FIG. 9 highlights the summed output of two signals.

EMBODIMENTS

Figure 1:
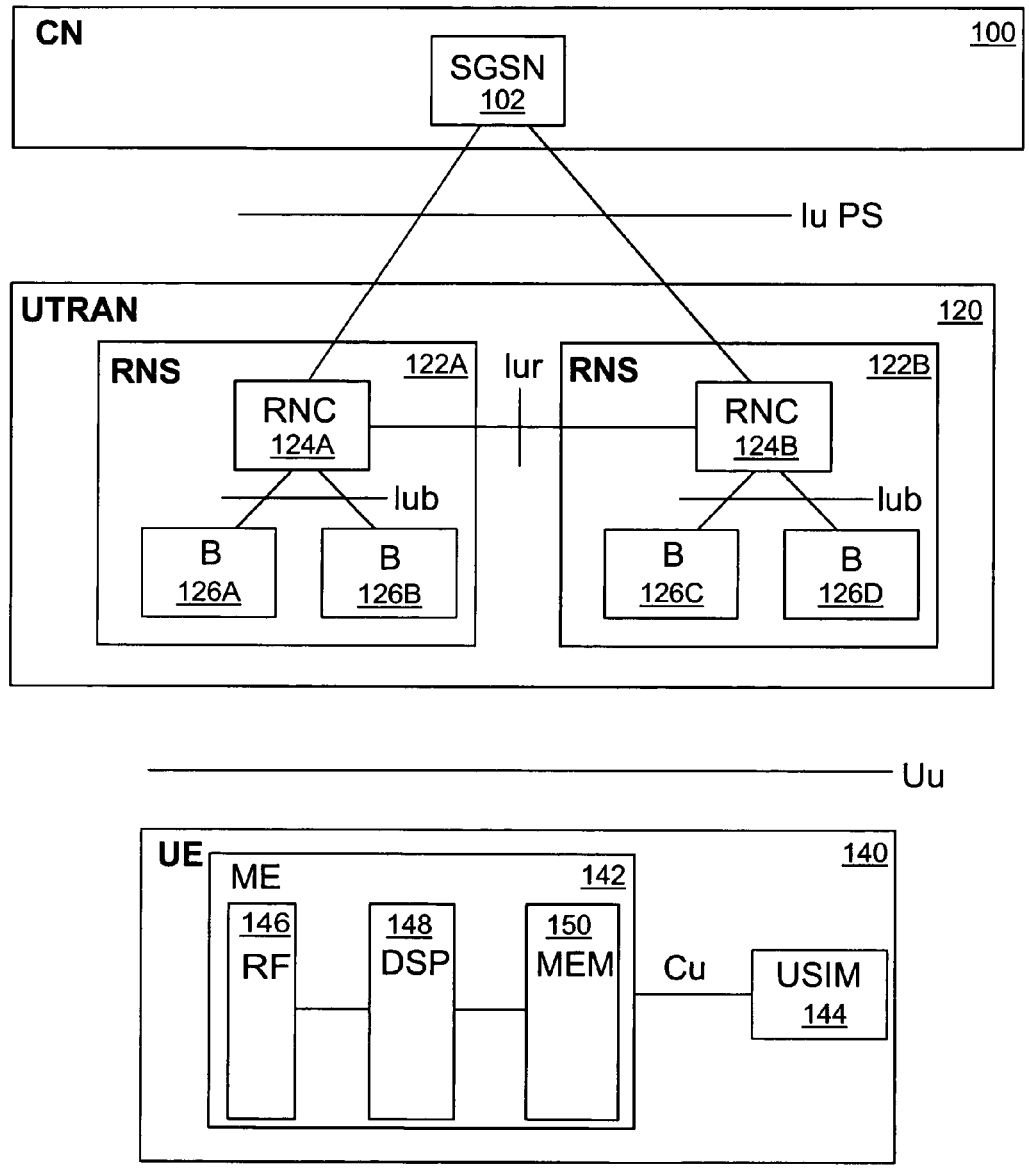

In one embodiment of the invention, the network is a UMTS network applying WCDMA technology. In the following, the structure of the UMTS network is shortly discussed with reference to FIG. 1.

The WCDMA can structurally be divided into a core network (CN) 100, a UMTS terrestrial radio access network (UTRAN) 120, and user equipment (UE) 140. The core network and the UTRAN are part of the network infrastructure of the wireless telecommunications system.

The core network includes a serving GPRS support node (SGSN) 102 connected to the UTRAN over an Iu PS interface. The SGSN represents the center point of the packet-switched domain of the core network, and the main task of the SGSN is to transmit/receive packets to/from the user equipment using the UTRAN. The SGSN may contain subscriber and location information related to the user equipment.

The UTRAN can include at least one radio network subsystem (RNS) 122A, 122B, each of which includes at least one radio network controller (RNC) 124A, 124B and at least one Node B 126A to 126D controlled by the RNC. The Node B implements the Uu radio interface, through which the user equipment may access the network infrastructure.

The user equipment or the mobile terminal may include two parts, which are mobile equipment (ME) 142 and a UMTS subscriber identity module (USIM) 144. The mobile equipment includes radio frequency parts 146 for providing the Uu-interface. The user equipment can further include a digital signal processor 148, memory 150, and computer programs for executing computer processes. The user equipment may further include an antenna, a user interface, and a battery. The USIM comprises user-related information and information related to information security, such as an encryption algorithm.

Figure 2:
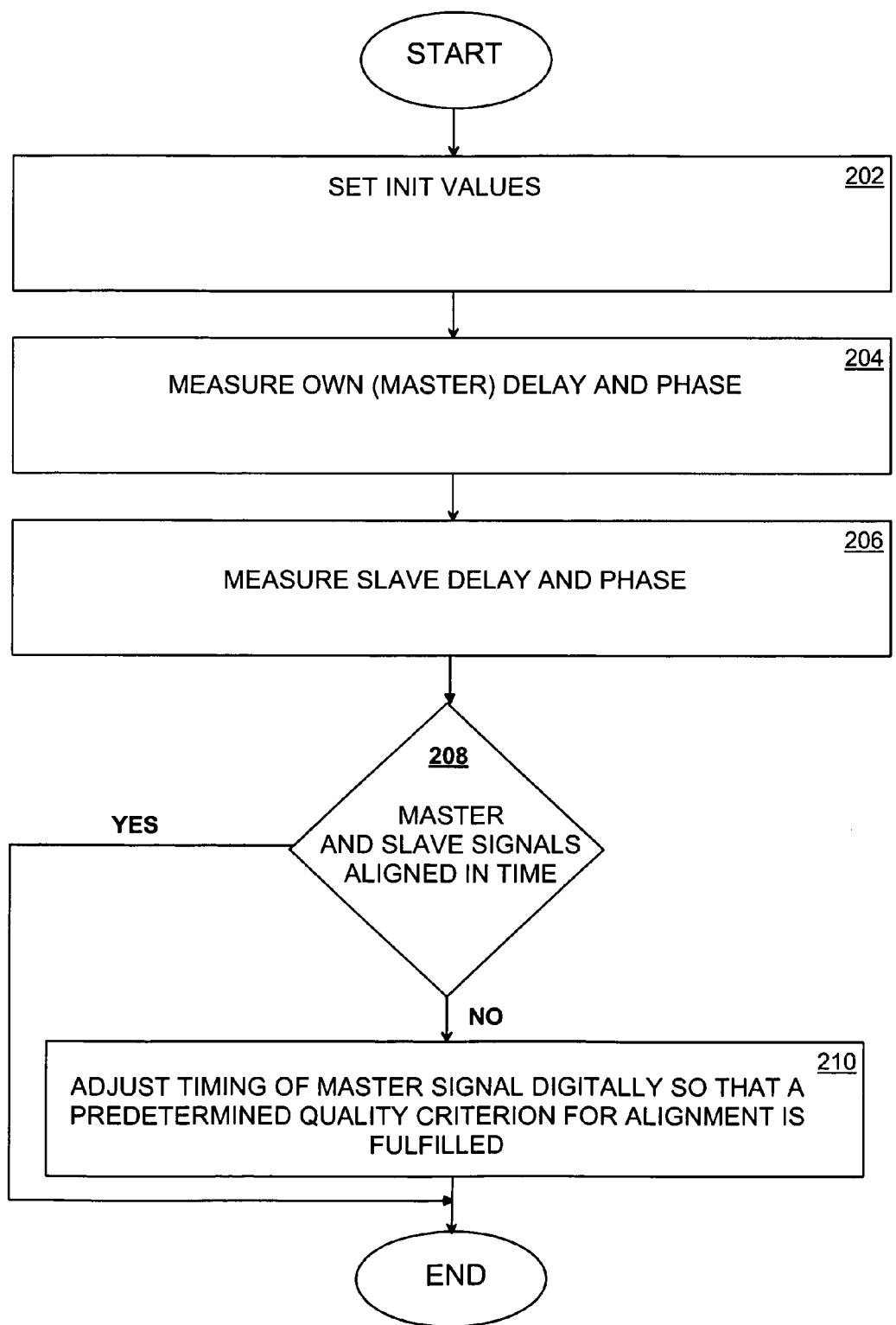
FIG. 2 illustrates one embodiment of a method.
Figure 3:
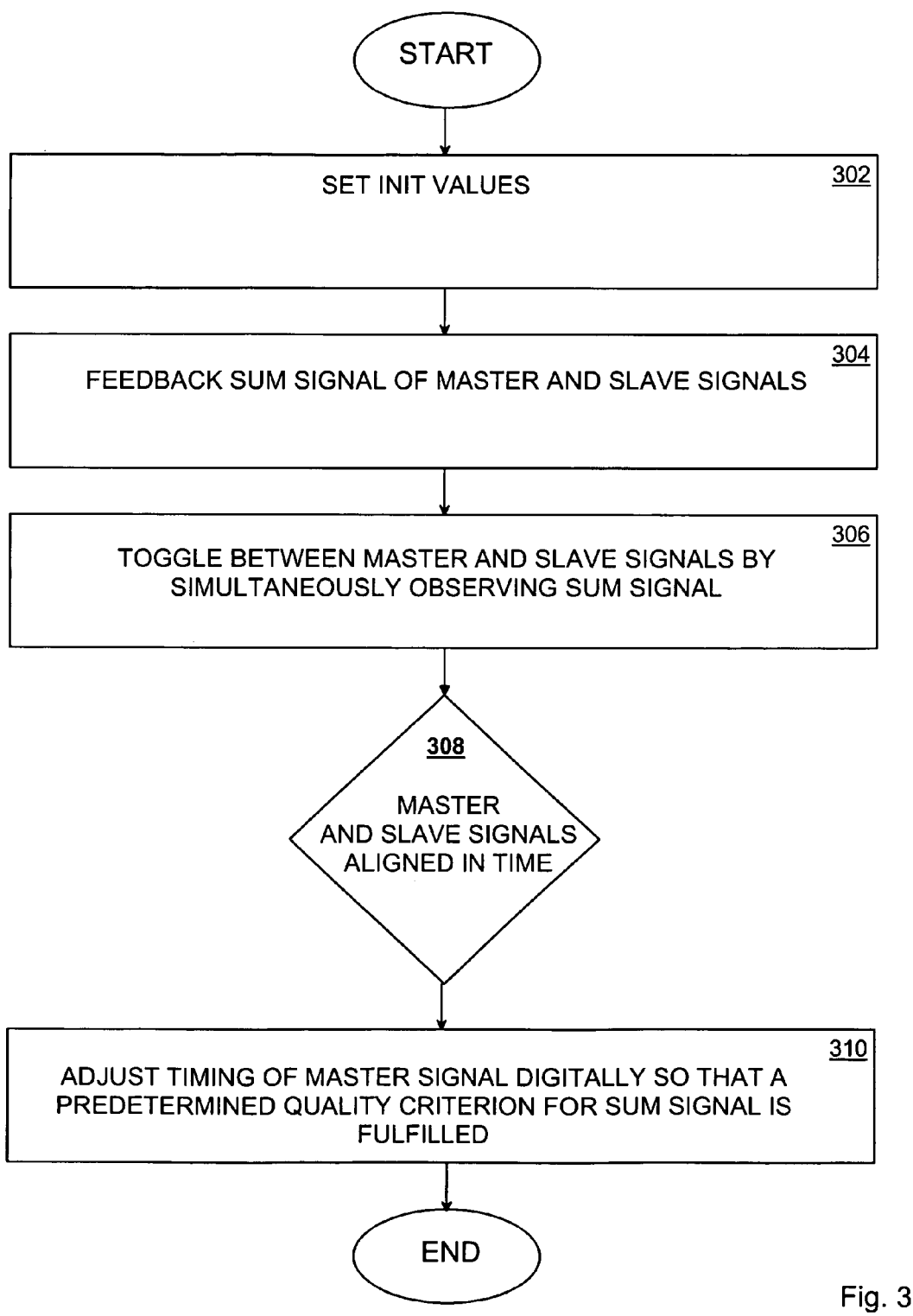
FIG. 3 illustrates another embodiment of a method.

FIGS. 2 and 3 illustrate embodiments of a method according to the invention. FIG. 2 shows an embodiment, where there are two transmitter units, each processing an instance of the same transmit signal. Practically, the situation may be such that each of the two transmitters provides approximately half of the total output power of the transmitter. One of these two transmitter units is, in conjunction with FIG. 2, called a master unit and the other one is called a slave unit. As illustrated by 204 and 206, the master unit is arranged to receive a portion of the signal processed by the slave unit. Additionally, the master is arranged to extract a portion of the signal processed by itself. The master and slave signal components may be extracted from amplified analog signals, which are converted back to digital form to be digitally processed in the master.

With reference to 208, the master unit compares the delays and phases of the signal components, one extracted from the signal processed by the master and one processed by the slave. If the delays and phases of the signal components are aligned, that is essentially equal, there is no need for adjustment of either of the signal components. However, if the delays and phases of the signal components differ from each other, the master signal's delay and/or phase may be adjusted as shown by 210. In one embodiment, adjustment of delay and phase are performed successively so that delays of the signals are adjusted first, and fine-tuning, that is phase adjustment, is made afterwards.

In 210, a quality criterion is used for determining when the delays and phases of the signal components are aligned with each other. In one embodiment, the master may sum the signal components and compare the sum with a predetermined power threshold. If the threshold value set for the power level of the sum signal is exceeded, the master may conclude that the signal components processed by the master and the slave are aligned with each other. If the threshold value of the sum signal power level is not reached, the delay and phase of the master signal may be digitally adjusted.

The method of FIG. 2 may be continuously applied in the transmitter.

FIG. 3 shows another embodiment of the method according to the invention. In 302, the initial values for the signals are determined. Initially, the method of FIG. 2 may be applied to obtain initial adjustment for the signal components processed by the master and the slave. After the initial adjustment, the method starting from 304 can be applied.

In 304, the amplified analog signal components processed by the master and slave transmitter units are summed to a sum signal and the sum signal is feedback to the master transmitter unit. In 306, the master determines the respective delays and phases of the signal components. Determination of delays and phases may be done in such a way, for instance, that the master toggles between having the master signal component processed and ceased. That is, at a first moment of time the master component is processed and the sum signal feedback to the transmitter unit acting as the master unit includes also the master signal. At a second moment of time, processing of the master signal component is stopped. The sum signal then includes only the slave signal component. By comparing the sum signals obtained at the first and second moments of time, the master unit can determine the delay and phase of the master signal component in comparison with the slave component.

In 308, the master evaluates if the master and slave signal components are aligned in time. If not, timing of the master signal is digitally adjusted in such a way that a predetermined quality criterion set for the alignment is fulfilled, as shown by step 310.

Although FIGS. 2 and 3 refer to two transmitter units, it is clear that there may be more of them. Furthermore, in contrary to embodiments disclosed in FIGS. 2 and 3, the delay and phase control need not be situated in a master transmitter unit but there can be a separate delay/phase adjustment block that does not integrally belong to any transmitter unit. Furthermore, the master transmitter unit needs not be the same all the time but the location of the functionality may alternate between different transmitter units.

Figure 4:
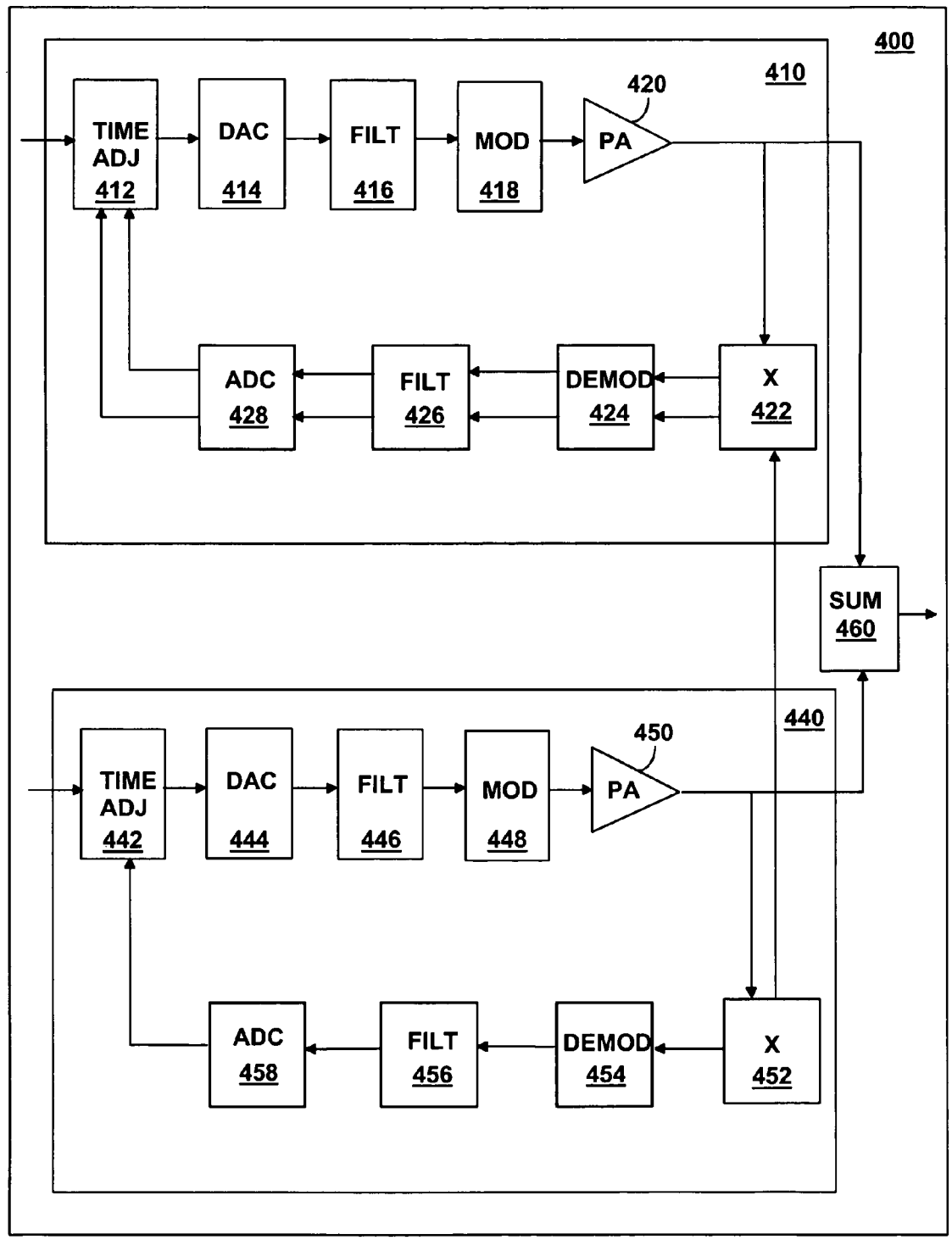
FIG. 4 shows an embodiment of a network element according to the invention.

FIG. 4 shows one embodiment of a transmitter 400 according to the invention. The transmitter may be a network element, such as a base station or a Node B, or the transmitter may be a mobile station. The embodiment refers to a transmitter where the predistortion principle is implemented in hardware. A feedback path is used to measure differences in delay and phase of two transmitter lines to be combined. The transmitter includes two transmitter units 410 and 440, which can be locked to the same reference clock signal. That is, the input signals to the transmitter units are exactly aligned in time with each other. Digital predistortion-based transmitters have functions to control transmitter delay/phase in a digital domain very accurately. To combine two different transmitter outputs processing the same transmit signal, delay/phase must be accurately controlled between two different transmitter units (lines) 410 and 440. In FIG. 4, the transmitter unit 410 is called a master unit and the unit 440 is called a slave unit. The slave unit 440 includes an output port in a switching block 452, via which output port the signal processed by the slave unit 440 is conveyed to an input (monitor) port located in a switching block 422 of the master unit 410.

The transmitter chain of the master can include an input port for receiving an instance of the transmit signal. The input port can be in the delay and phase estimation block 412, from which the signal is fed to a digital to analog-converter 414. After the filtering performed in a filtering unit 416, the signal is modulated in a modulating unit 418 and forwarded to a power amplifier 420. A coupler (not shown) may divide the signal between the summing unit 460 and the switching unit 422. From the switch 422 the signal may be conveyed to a demodulation unit 424, which includes functionality related to down-conversion of the signal to intermediate frequency. The signal is then filtered in a filtering unit 426 and converted to digital form in an analog-to-digital converter 428. The digital signal is then transferred then to the timing adjustment unit 412 for alignment of delay and phase of at least one of the signal components processed in the transmitter units 410 and 440.

The delay and phase estimation block 412 may receive input also from the slave transmitter unit 440. The slave transmitter unit processes another instance of the same input signal as the master unit 410. The functionality of the slave transmitter unit can be the same as the functionality of the master unit, that is the digital input signal is converted to an analog signal, filtered, modulated and amplified in respective units 444, 446, 448 and 450. In the example of FIG. 4, the feedback chain 454, 456 and 458 would not be necessary because the slave signal is conveyed to the master unit 410 so that the delay and phase of the master signal can be adjusted, if needed. However, practically it is advantageous that the transmitter units 410 and 440 have equal functionalities so that any transmitter unit may take over or implement the master functionality, if need be.

In the transmitter of FIG. 4, adjustment and measurement of the delay and phase can be adaptive, and an optimal combined power level can thus be maintained. The transmitter's delay and phase calibration is not needed, since the phase and the delay can be adjusted adaptively during the normal operation based on the signal samples received from the monitor port of the master unit. Delay and phase measurement is also very accurate, since the same feedback unit is used to measure both the slave and master units' delay and phase.

Figure 5:
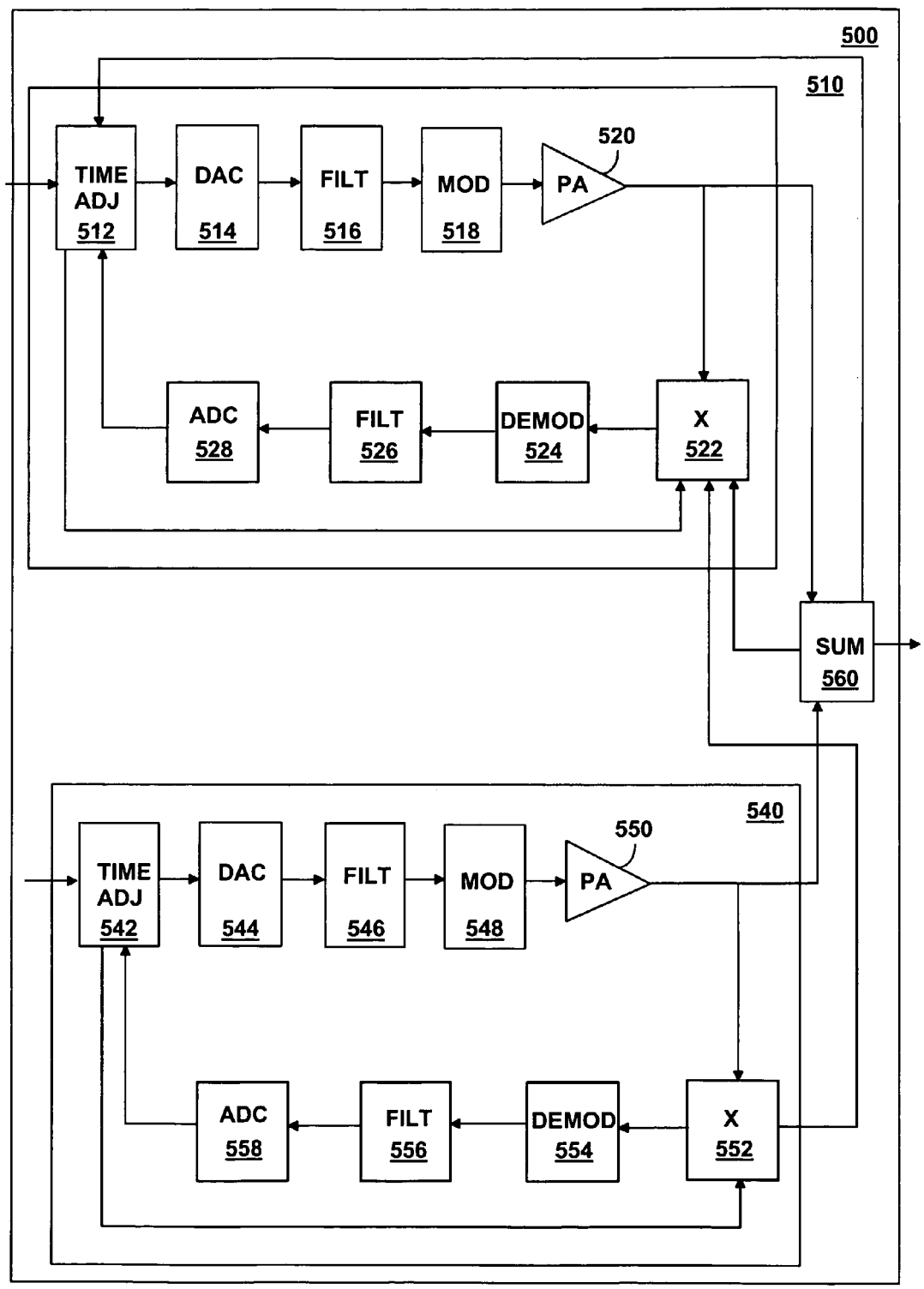
FIG. 5 shows another embodiment of a network element according to the invention.

FIG. 5 shows another embodiment of a transmitter according to the invention. With regard to functionality of different units in the transmitter 500, reference is made to the corresponding elements in FIG. 4. The embodiment in FIG. 5 differs from the embodiment in FIG. 4 in that there is a feedback link from the summing unit 560 to the delay and phase estimation block 512.

The principle in FIG. 5 is such that, in the initialization phase, the delay and phase adjustment is performed using only the master and slave signals. Thus, initially, the master and slave signals are fed to the timing adjustment block 512 for adjustment of the delay and phase of the input signals. The slave signal is fed to the delay and phase estimation block 512 via the switching units 552 and 522. The master signal is correspondingly conveyed to the delay and phase estimation block 512 via the switching unit 522.

After the initialization phase, the delay and phase adjustment of the transmitter is done using the sum signal obtained from the summing unit 560. In this embodiment, the delay and phase estimation block 512 receives the sum signal, which is converted to a digital sum signal in the switching unit 522, and the feedback master signal. By toggling the master signal on and off, the respective delays of the master and slave signals can be determined from the sum signal. Alternatively, the master signal can be subtracted from the sum signal, whereby the slave signal can be determined. On the basis of the sum signal, the master unit can adjust its own delay and phase to keep the summing quality at a specified level.

In one embodiment, the summing unit 560 detects the delay and phase difference between the signals processed in the transmitter units 510 and 540. In this embodiment, the summing unit can directly inform the timing unit 512 about the timing difference, which is highlighted by the connecting line between the summing unit 560 and timing unit 512.

Figure 6:
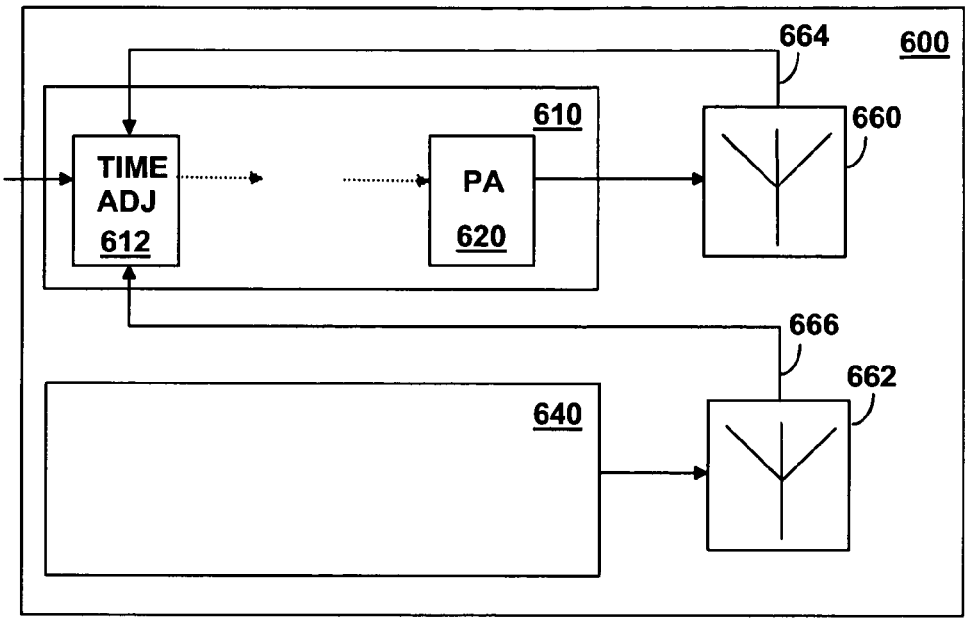
FIG. 6 shows one embodiment of a transmitter unit according to the invention.
Figure 7:
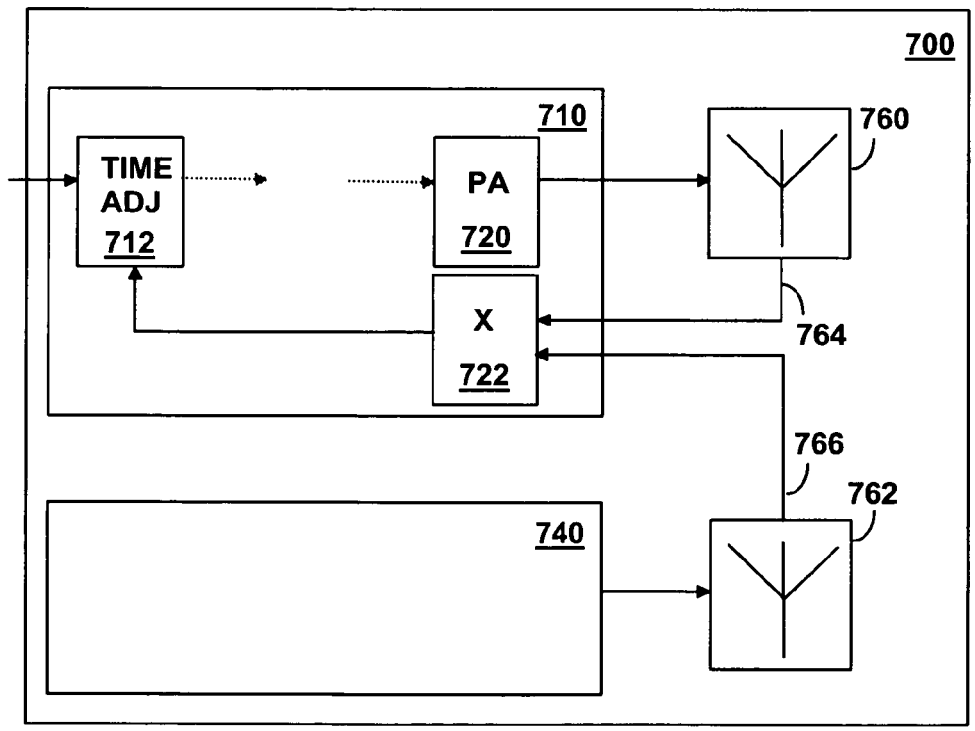
FIG. 7 shows another embodiment of a transmitter according to the invention.

FIGS. 6 and 7 show two embodiments for measuring the timing difference of two signals. In FIG. 6, the signals from transmitter units 610 and 640 are forwarded to respective transmit antenna elements 660 and 662. Transmit antenna elements are connected to a delay and phase adjustment unit 612 by respective measurement lines 664 and 666. The electrical lengths of the measurement lines are known, and thus the delay and phase adjustment of the adjustment unit is made possible.

FIG. 7 resembles the structure in FIG. 6, but now connecting lines 764 and 766 lead to a switching unit 722. In the embodiment of FIG. 7, the electrical lengths of the connecting lines 764 and 766 are matched, that is they are either equal or the electrical length difference is known.

In still another embodiment, we may consider the embodiment of FIG. 4, where the signals from the power amplifiers 420 and 450 are directly connected to respective antenna elements by separate antenna lines without connecting the transmitter units to the summing unit 460. In such a case, the antenna lines may be of a predetermined electrical length so that the timing error is caused between the power amplifiers and the antenna elements and can thus be determined.

The embodiments illustrated in FIGS. 6 and 7 are suitable to be used in a smart antenna system. Smart antenna systems are well known in the art and need not be explained in detail here. The basic idea in a smart antenna system is to combine the signal processing capability of multiple antenna elements to adapt transmit/receive radiation patterns to the signal propagation environment. The goal is to increase gain according to the location of the user.

Smart antenna systems can generally be classified to switched beams of adaptive array systems. In switched beam systems, the signal strength is detected and one of several predetermined fixed beams is selected. The active beam may be changed when the mobile moves in the system. Adaptive array systems take advantage of locating and tracking various types of signals to dynamically minimize interference and maximize the reception of the desired signal.

The inventive concept of being able to exactly determine the timing difference between the signals processed in different transmitter units can advantageously be utilized in a smart antenna system. Each transmitter unit can be connected to an antenna element, each having a radiation pattern. The transmitter can adjust the timing of the input signals to different transmitter units so that a combination of radiation patterns of at least two antenna elements produces a desired radiation pattern, such as a transmit beam. In another embodiment, the signals directed to different transmit antennas, which are used when forming a beam, can be exactly aligned with each other in time.

In one embodiment, when trying to determine the optimum timing difference between signals from transmitter units, the power of the sum signal is maximized until a predetermined criterion is fulfilled. In another embodiment, the aim is to minimize the power directed to a loss port, whereby power of the sum signal is maximized.

Figure 8:
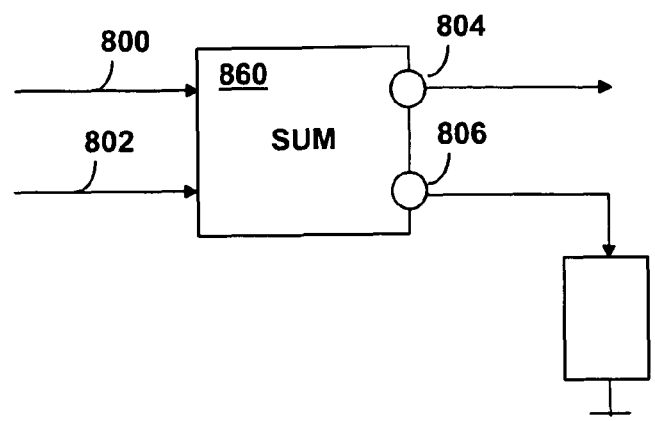
FIG. 8 shows one embodiment of a summing unit.

This is illustrated by FIGS. 8 and 9. FIG. 8 shows a summing unit 860, which receives input signals 800 and 802 from two transmitter units. The summing port 804 outputs the effective sum signal of the two input signals 800 and 802. The rest of the input power, that is dissipated power, is directed to an excess port 806.

FIG. 9 demonstrates the output of summing of two input signals. The x-axis shows the timing difference between the input signals, and the y-axis shows the level of the output power. Curve 900 shows the sum output power and curve 902 illustrates dissipated power. The timing difference 904, about 275 time units, simultaneously maximizes the sum output power and minimizes the dissipated power. Thus, seeking the optimal timing difference between the input signals, the maximum sum output power or the minimum dissipated power might be used as a criterion.

The invention, including different means for carrying out functions in a transmitter, a base station or a mobile station may be implemented by software, which is loadable and executable in a processor. The software may be packaged to a software product including software code portions for implementing steps of the invention. Alternatively, the invention may be implemented in ASIC (Application Specific Integrated Circuit) or by separate logic components. The invention may be implemented on a processor or a chipset in a transmitter. The invention may be implemented on a module mountable to a transmitter.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus, comprising:
at least two transmitter units;
wherein each of the at least two transmitter units are configured to input an instance of a digital transmit signal, convert the digital transmit signal to an analog radio signal, and amplify the analog radio signal, and
wherein the apparatus is configured to:
determine a timing difference between the amplified analog signals, and adjust a timing of at least one of the digital input signals, so that a predetermined criterion is fulfilled;
sum the amplified analog signals from the at least two transmitter units to a sum signal;
convert the sum signal to a digital feedback sum signal;
cease processing of one of the at least two transmitter units;
observe the digital feedback sum signal while ceasing signal processing of one of the at least two transmitter units;
and
determine a timing influence of the ceased signal on the observed digital feedback sum signal.

2. The apparatus according to claim 1, wherein the apparatus is configured to convert the amplified analog signals obtained from the at least two transmitter units to feedback digital signals.

3. The apparatus according to claim 2, wherein the timing difference between the amplified analog signals processed in the at least two transmitter units is determined from the feedback digital signals.

4. The apparatus according to claim 1, wherein the apparatus is configured to perform timing adjustment of at least one of the digital input signals.

5. The apparatus according to claim 1, wherein the apparatus is configured to:
convert the sum signal to a digital feedback sum signal;
adjust a timing of an input signal of at least one of the at least two transmitter units, so that power of the digital feedback sum signal fulfils the predetermined criterion.

6. The apparatus according to claim 1, wherein in the timing adjustment, at least one of delay and phase of the digital input signal is adjusted.

7. The apparatus according to claim 1, wherein
the predetermined criterion is a threshold value for a power of a sum signal.

8. The apparatus according to claim 1, wherein
the predetermined criterion is that the signals processed by the at least two transmitter units are aligned with each other in time at antenna elements following the transmitter units.

9. The apparatus according to claim 1, wherein the digital input signals to the at least two transmitter units are locked to a same reference clock signal.

10. The apparatus according to claim 1, wherein:
each of the at least two transmitter units are connected to an antenna element, each antenna element having a radiation pattern; and
the transmitter is configured to adjust timing of the digital input signals so that a combination of radiation patterns of at least two antenna elements produces a desired combination radiation pattern.

11. The apparatus according to claim 1, wherein
the apparatus comprises a predistortion transmitter.

12. The apparatus according to claim 1, wherein the apparatus comprises a smart antenna transmitter.

13. An apparatus, comprising:
at least two transmitter units, each of the at least two transmitter units comprising an input configured to receive an instance of a digital transmit signal, a converter configured to convert the digital transmit signal to an analog radio signal, and an amplifier configured to amplify the analog radio signal;
wherein the apparatus is configured to
determine a timing difference between the amplified signals, and
adjust a timing of at least one of the digital input signals, so that a predetermined criterion is fulfilled;
sum the amplified analog signals from the at least two transmitter units to a sum signal;
convert the sum signal to a digital feedback sum signal;
cease processing of one of the at least two transmitter units;
observe the digital feedback sum signal while ceasing signal processing of one of the at least two transmitter units; and
determine a timing influence of the ceased signal on the observed digital feedback sum signal.

14. The apparatus according to claim 13, wherein the apparatus comprises a base station.

15. A method, comprising:
inputting an instance of a same digital input signal into at least two transmitter units;
converting, in each of the at least two transmitter units, the digital input signal to analog radio signals and amplifying the analog radio signals;
determining a timing difference between the amplified signals; and
adjusting a timing of at least one of the digital input signals, so that a predetermined criterion is fulfilled;
summing the amplified analog signals to produce a sum signal;
converting the sum signal to a digital feedback sum signal;
ceasing processing of one of the at least two transmitter units;
observing the digital feedback sum signal while ceasing signal processing of one of the at least two transmitter units; and
determining a timing influence of the ceased signal on the sum signal.

16. The method according to claim 15, further comprising:
converting the amplified analog signals to feedback digital signals.

17. The method according to claim 16, further comprising:
determining the timing difference between the amplified analog signals from the feedback digital signals.

18. The method according to claim 15, further comprising:
performing timing adjustment of at least one of the digital input signals.

19. The method according to claim 15, further comprising:
converting the sum signal to a digital feedback sum signal; adjusting a timing of an input signal of at least one of the at least two transmitter units, so that power of the digital feedback sum signal fulfils a predetermined criterion.

20. The method according to claim 15, wherein the adjusting comprises adjusting at least one of delay and phase of the digital input signal.

21. The method according to claim 15, further comprising:
locking the digital input signals to a same reference clock signal.

22. A non-transitory computer readable medium embodied with a computer program, the computer program performing the following operations when executed:
inputting an instance of a same digital input signal into at least two transmitter units;
converting, in each of the at least two transmitter units, the digital input signal to analog radio signals and amplifying the analog radio signals;
determining a timing difference between the amplified signals; and
adjusting a timing of at least one of the digital input signals, so that a predetermined criterion is fulfilled;
summing the amplified analog signals to produce a sum signal;
converting the sum signal to a digital feedback sum signal;
ceasing processing of one of the at least two transmitter units;
observing the digital feedback sum signal while ceasing signal processing of one of the at least two transmitter units; and
determining a timing influence of the ceased signal on the sum signal.

* * * * *